US011641592B1

(12) United States Patent
Duraibabu et al.

(10) Patent No.: US 11,641,592 B1
(45) Date of Patent: May 2, 2023

(54) DEVICE MANAGEMENT USING STORED NETWORK METRICS

(71) Applicant: Amazon Technologies, Inc., Seattle, WA (US)

(72) Inventors: Venkatesh Duraibabu, Redmond, WA (US); Sidharth Kodikal, San Jose, CA (US); Sagar Narang, Seattle, WA (US); Lakshminarasimhan Muralidharan, Sammamish, WA (US); Zhejun Henry Fang, Santa Clara, CA (US); Aditya Bhave, Santa Clara, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 379 days.

(21) Appl. No.: 16/667,683

(22) Filed: Oct. 29, 2019

(51) Int. Cl.
*H04W 24/04* (2009.01)
*H04W 88/02* (2009.01)
*G10L 15/22* (2006.01)

(52) U.S. Cl.
CPC ............ *H04W 24/04* (2013.01); *G10L 15/22* (2013.01); *H04W 88/02* (2013.01)

(58) Field of Classification Search
None
See application file for complete search history.

(56) References Cited

U.S. PATENT DOCUMENTS

| 2012/0218909 A1* | 8/2012 | Yamaguchi | H04W 76/10 370/252 |
| 2014/0067405 A1* | 3/2014 | Patel | G10L 19/00 704/500 |
| 2015/0119043 A1* | 4/2015 | Gopal | H04W 36/0061 455/437 |

(Continued)

OTHER PUBLICATIONS

Author unknown; "How does the test itself work? How is the result calculated?"; Jan. 13, 2012, Retrieved from Speedtest.net; 3 pgs.

(Continued)

*Primary Examiner* — Quynh H Nguyen
(74) *Attorney, Agent, or Firm* — K&L Gates LLP

(57) ABSTRACT

Systems and methods for managing network connectivity of speech processing-enabled devices are provided. The speech-enabled device may periodically monitor a variety of metrics related to the network connectivity status of the device, and save those metrics in a local events log. The speech-enabled device may then periodically send those metrics to a remote speech processing management system. Users may then use voice commands to request the status of the speech-enabled device, and the speech-enabled device will send that request to the speech processing management system. The speech processing management system can then retrieve the historical metrics for that device and determine one or more inferences regarding the condition of the device. These inferences are used to diagnose potential network connectivity problems being experienced by the speech-enabled device, and to generate recommendations for remediating those problems. These recommendations may then be provided to the user as verbal instructions for troubleshooting and/or resolving those problems.

20 Claims, 5 Drawing Sheets

(56) References Cited

U.S. PATENT DOCUMENTS

| | | | | |
|---|---|---|---|---|
| 2015/0281020 A1* | 10/2015 | Yun | ..................... | H04W 24/08 |
| | | | | 370/252 |
| 2015/0382215 A1* | 12/2015 | Huang | ................. | H04W 24/08 |
| | | | | 370/252 |
| 2017/0366249 A1* | 12/2017 | Van Oost | .............. | H04W 24/02 |
| 2018/0041830 A1* | 2/2018 | Shahamat | .............. | H04N 7/142 |
| 2019/0312924 A1* | 10/2019 | Bhagavatula | ........... | H04L 67/10 |
| 2019/0357074 A1* | 11/2019 | Priore | ................... | H04W 24/02 |
| 2020/0103871 A1* | 4/2020 | Laycock | ............... | G06Q 50/04 |

OTHER PUBLICATIONS

Mat; Test your internet speed with Google Home; Feb. 28, 2018; 4 pgs.

Tee; Performing a SpeedTest Using Google Home and/or Alexa; mysmartcave; Apr. 27, 2019; 11 pgs.

* cited by examiner

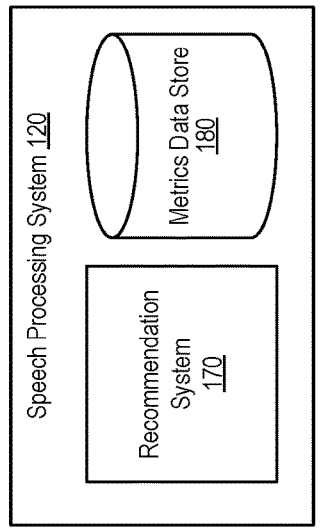
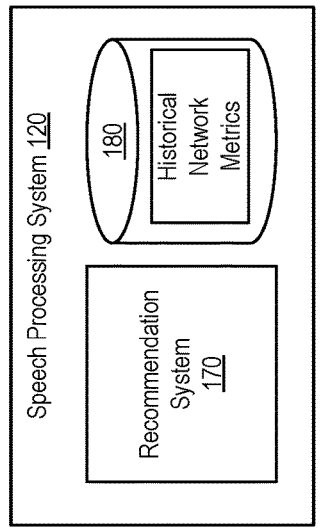
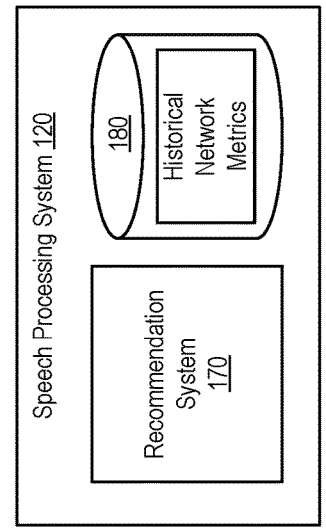
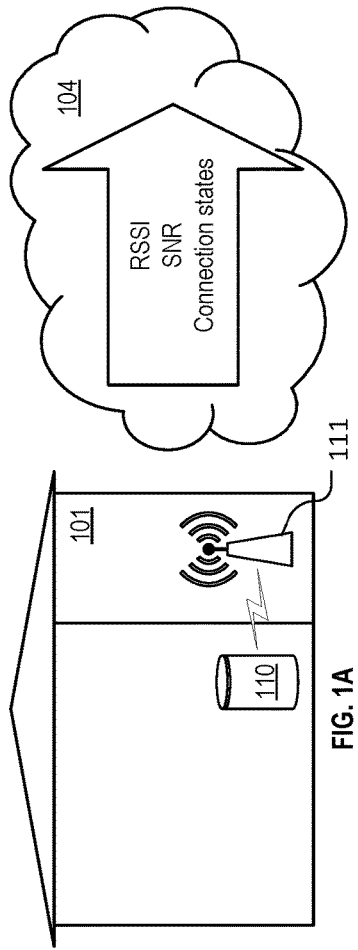
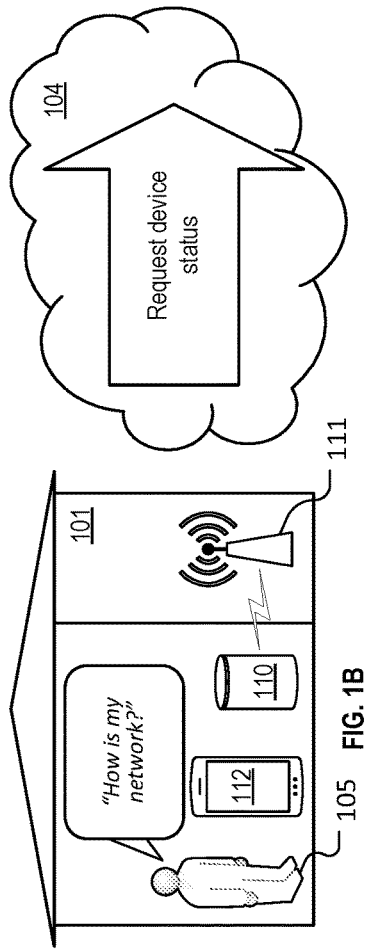
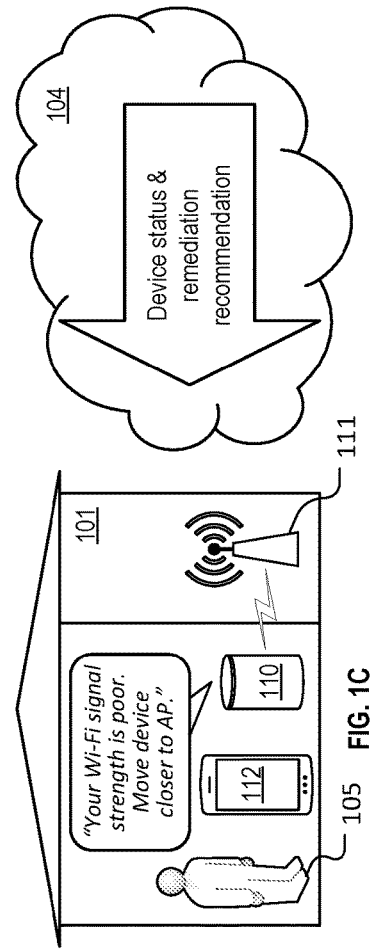
FIG. 1A
FIG. 1B
FIG. 1C

DEVICE MANAGEMENT USING STORED NETWORK METRICS

BACKGROUND

Homes and other user premises are increasingly equipped with always-on Internet or "cloud" connectivity. Automatic speech recognition (ASR) combined with language processing techniques have resulted in the widespread popularity of hands-free, speech processing-enabled devices capable of receiving and processing commands from a user based on the user's spoken commands. Because of their ability to process voice commands, many speech processing-enabled devices are provided with minimal or no graphical displays for visually presenting information to the user, as has been commonly used in personal computing. Many speech processing-enabled devices utilize cloud-based speech processing services, and are often connected to wireless local area networks (WLANs) within the users' homes, with those WLANs providing network connectivity to the cloud-based speech processing services on the Internet or other wide area network (WAN). However, when these speech-enabled devices experience network connectivity issues, it can be difficult for users to diagnose and resolve those issues using only voice controls.

BRIEF DESCRIPTION OF DRAWINGS

FIGS. 1A-1C are illustrative depictions of a method of managing a computing device, in accordance with embodiments of the present invention.

DETAILED DESCRIPTION

Figure 2:
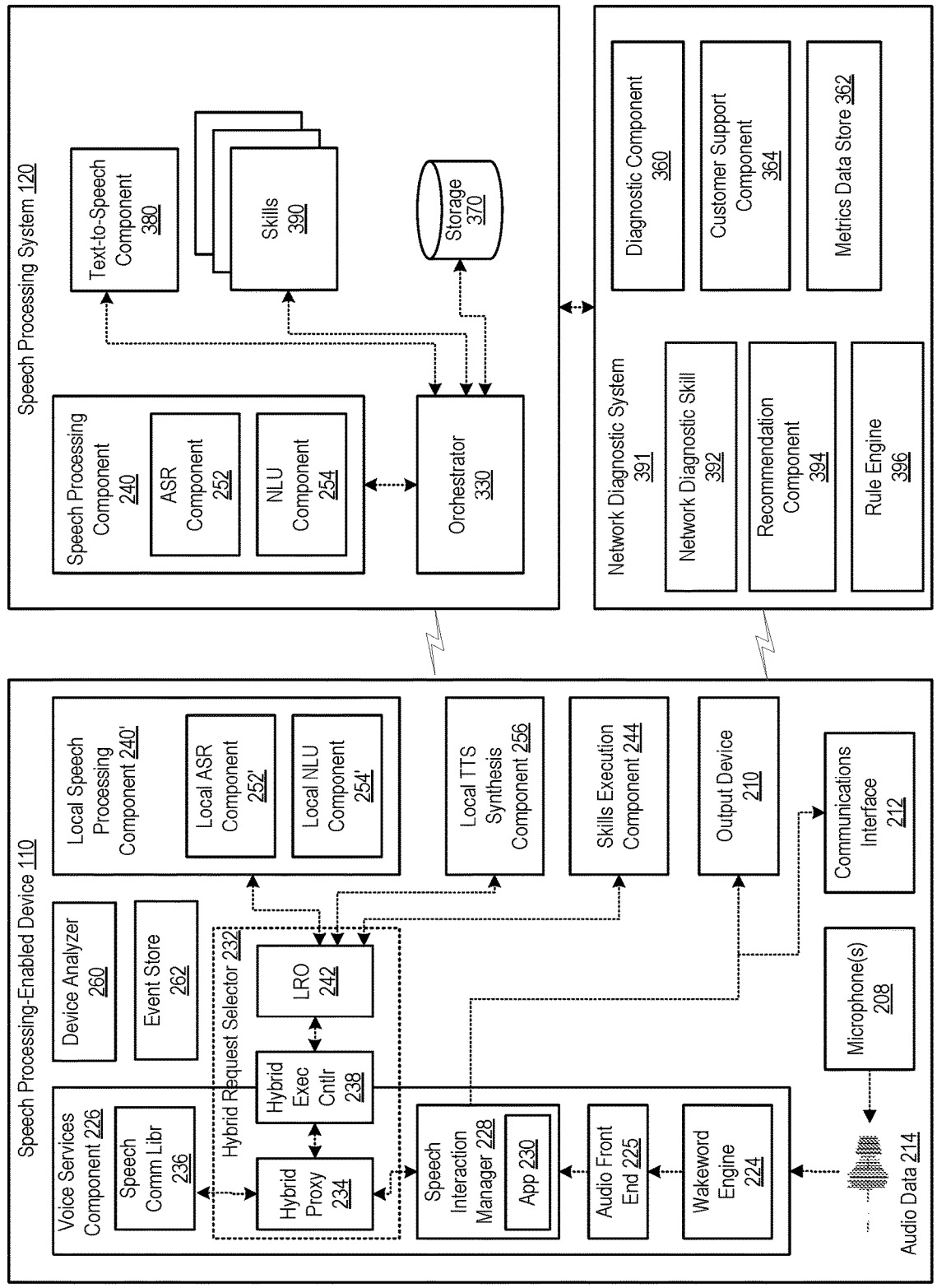
FIG. 2 is a block diagram illustrating a speech processing-enabled device and a speech processing management system, in accordance with embodiments of the present invention.

In the following description, reference is made to the accompanying drawings that illustrate several examples of the present invention. It is understood that other examples may be utilized and various operational changes may be made without departing from the spirit and scope of the present disclosure. The following detailed description is not to be taken in a limiting sense, and the scope of the embodiments of the present invention is defined only by the claims of the issued patent.

In accordance with embodiments of the present invention, systems and methods are provided for managing network connectivity of computing devices, and, in some embodiments, speech processing-enabled devices or speech-enabled devices. The speech-enabled device may periodically monitor a variety of metrics related to the network connectivity status of the device, and save the network connectivity metric data in a local events log. The device may then periodically send that network connectivity metric data over the Internet to a cloud-based management system, e.g., a speech processing management system. Users may then use voice commands to inquire as to the status of the speech-enabled device, and the speech-enabled device will send that request to the speech processing management system. The speech processing management system can then retrieve the historical metrics for that device and determine one or more inferences regarding the condition of the device. These inferences are used to diagnose potential network connectivity problems being experienced by the speech-enabled device, and to generate recommendations for remediating those problems. These recommendations may then be provided to the user as verbal instructions for troubleshooting and/or resolving those problems. In some examples, the diagnosis and resolution of network connectivity problems may be performed using only a speech processing-enabled device having limited or no graphical or physical user interfaces, without the need for a supplemental computing device having a graphical display and keyboard.

FIGS. 1A-1C are illustrative depictions of a method of managing a computing device, in accordance with embodiments of the present invention. FIG. 1A depicts a user's home 101 containing a first device (e.g., a speech processing-enabled device 110) wirelessly connected to a second device (e.g., a router 111 comprising a wireless access point device which provides modem and wireless access point functionality). In many cases, the wireless router 111 may be located in a different room of the home 101 than the other computing devices on the home's LAN, such as the device 110.

In various examples, a speech processing-enabled device 110 may be any computing device with a voice interface that may be used to interact with and/or control operation of the device 110. For example, a computing device employing a smart home assistant (sometimes referred to as a "virtual assistant") may be an example of speech processing-enabled device 110. In various other examples, speech processing-enabled device 110 may be a computing device comprising at least one processor that may include speech processing functionality (described below in reference to FIG. 2). The speech processing-enabled device 110 may communicate over WAN 104 with a back-end speech processing management system (e.g., speech processing management system 120). In some examples, speech processing system 120 may perform additional speech processing beyond the speech processing performed locally by speech processing-enabled device 110. For example, speech processing system 120 may represent a cloud-based speech processing service used to process audio data sent over WAN 104 by speech processing-enabled device 110. In other embodiments, the device 110 may include other user interfaces for receiving user inputs, such as, e.g., a keyboard, mouse, touchpad, or touchscreen. These user interfaces may be in addition to the voice control functionality described above, or, in devices that are not speech processing-enabled, may be in place of this voice control functionality.

The device 110 may be programmed to periodically detect a variety of network status metrics and connection status metrics, such as, e.g., Received Signal Strength Indicator (RSSI) power level values, signal-to-noise ratio (SNR) values, the connection state of the device 110, download/upload speed, and latency metrics. In some embodiments, this metric collection operation is performed on a regular schedule, such as, e.g., once every minute, every five minutes, every ten minutes, or every hour, and the metric data may be stored in an events log in a local storage of the speech-enabled device 110. The stored metric data may then be periodically sent over a WAN 104 (e.g., the Internet) to a speech processing system 120. The sending of the stored metric data may occur on any desired schedule, such as, e.g., once per day. The speech processing system 120 may then store that metric data in a metrics data store 180.

In FIG. 1B, a user 105 has entered the room containing the speech-enabled device 110. In some systems, speech recognition and/or voice-controlled devices activate upon detection of a spoken "wakeword." Natural language processing is used to translate the spoken requests into semantic interpretations of the spoken command. Executable instructions are generated based on the semantic interpretation of the spoken command. The executable instructions are executed and a corresponding task is performed. Such speech processing and voice control may be used as a control interface for personal computers, hand-held devices, telephone computer systems, and a wide variety of other computing devices to improve human-computer interactions. In various examples, speech processing-enabled devices may comprise or may be configured in communication with displays for showing images and video and/or speakers for outputting audio.

As shown in FIG. 1B, the user 105 has spoken the wakeword followed by the voice command, "How is my network?" The device 110 interprets the detected audio data (as will be described in greater detail below) and sends a device status request to the speech processing system 120 via the wireless router 111 and WAN 104. The speech processing system 120 then processes this request with a recommendation system 170 (as will be described in greater detail below). The recommendation system 170 retrieves the historical network connectivity metric data saved in the data store 180 and analyzes that metric data to determine an inference regarding the condition of the device 110. The metric data may include, e.g., network signal strength data and connection state data. The recommendation system 170 may determine that an average network signal strength is below a predetermined signal strength threshold value, or that a wireless signal quality is below a predetermined wireless signal quality threshold value. In the illustrated example, the recommendation system 170 determines that the average of the RSSI values over a period of time (e.g., the last hour) is −85 dBm. With this information, the recommendation system 170 determines that the average RSSI value is between −100 dBm and −80 dBm, which is the range of signal strengths that falls within the category of "poor." Therefore, the recommendation system 170 determines the inference that the wireless signal strength is poor. The speech processing system 120 then sends this wireless signal strength inference back to the device 110, along with other metrics, such as, e.g., download speed, upload speed, and ping latency, and commands effective to cause the speech-enabled device 110 to audibly communicate the inference to the user 105 by saying, "Your Wi-Fi signal strength is poor."

When the determined inference reflects an unsatisfactory device condition, the recommendation system 170 may utilize the determined inference regarding the signal strength to determine a recommendation to remediate the unsatisfactory device condition. In the illustrated example, the recommendation for remediation of the poor signal strength is to move the device 110 closer to the wireless router 111. The speech processing system 120 then sends this recommendation for remediation back to the device 110, along with a command effective to cause the device 110 to audibly communicate the recommendation for remediation to the user 105 by saying, "Move the device closer to the wireless access point." In some embodiments, after the device 110 communicates the inference of "Your Wi-Fi signal strength is poor" to the user 105, the device 110 may then prompt the user 105 for instructions by saying, "Would you like me to suggest some troubleshooting steps?" If the user 105 answers in the affirmative, then the device 110 will communicate the recommendation of "Restart the wireless access point."

In some embodiments, the recommendation system 170 may determine inferences without an explicit user request for the network status. For example, if the recommendation system 170 detects that the device 110 has experienced an excessive number of operational disconnections from the router 111 or the speech processing system 120, it may proactively notify the user that the signal strength is poor, e.g., by, audibly communicating to the user, "We have noticed that your device is frequently disconnecting from Wi-Fi." In some embodiments, the recommendation system 170 may also provide a recommendation for remediation, e.g., by audibly communicating, "Move the device closer to the wireless access point."

FIG. 2 is a block diagram illustrating a speech processing-enabled device 110 and a speech processing system 120, in accordance with embodiments of the present invention.

Automatic speech recognition (ASR) is a field of computer science, artificial intelligence, and linguistics concerned with transforming audio data associated with speech into text data representative of that speech. Natural language understanding (NLU) is a field of computer science, artificial intelligence, and linguistics concerned with enabling computers to derive meaning from text input containing natural language, resulting in specific executable commands or other type of instructions. Text-to-speech (TTS) is a field of computer science, artificial intelligence, and linguistics concerned with enabling computers to output synthesized speech. ASR, NLU, and TTS may be used together as part of a speech processing system.

Spoken language understanding (SLU) is a field of computer science, artificial intelligence, and/or linguistics that receives spoken language as an input, interprets the input, and generates executable commands that may be executed by one or more other computing devices and/or speech processing components. In various examples, spoken language understanding may be a combination of ASR systems and NLU systems, while in other examples, spoken language understanding may be a single model or other type of component effective to perform the functions of both ASR and NLU or otherwise take audio data as an input and output executable commands or other types of instructions representing the meaning of the audio data. In various further examples, SLU may include TTS where a machine learning model may receive input audio data (e.g., a user utterance) and may generate output audio data in response to the utterance.

Speech processing may be used in a variety of contexts, including in speech processing-enabled devices (e.g., devices employing voice control and/or speech processing "personal assistants") and/or systems. Examples of speech processing systems and/or voice-enabled personal assistants include the Siri system from Apple Inc. of Cupertino, Calif., voice-enabled actions invoked by the Google Assistant system from Google LLC of Mountain View, Calif., Dragon speech recognition software from Nuance Communications of Burlington, Mass., the Cortana system from Microsoft of Redmond, Wash., voice-enabled skills invoked by the Alexa system from Amazon.com, Inc. of Seattle, Wash., etc.

Speech processing-enabled device 110 may include microphones 208 (e.g., far-field microphone arrays) used to transform audio into electrical signals. Speech processing may then be performed, either locally by the speech processing-enabled device 110, by one or more other computing devices communicating with the speech processing-enabled device 110 over a network (e.g., speech processing system 120), or by some combination of the speech processing-enabled device 110 and the one or more other computing devices. In various examples, speech processing-enabled device 110 may include and/or may be configured in communication with output device(s) 210 (e.g., speakers and/or displays) effective to output information obtained in response to a user's spoken request or command, or to output content that may be of interest to one or more users. As used herein, a display of speech processing-enabled device 110 refers to a display effective to output graphics such as images and/or video. Further, as used herein, a displayless device refers to a device that does not include a display that is effective to render graphical images or text.

A speech processing enabled computing system may respond to user utterances by outputting content and/or performing one or more other actions, such as playing music, providing information, calling a taxi, displaying an image, etc. Generally, input data received by the various speech processing systems and components described herein may comprise natural language input data. Natural language input data may be in the form of audio data representing spoken user utterances (e.g., a spoken user request), text data (e.g., a request typed by a user), gesture data (e.g., data representing a user shaking their head while wearing ear buds, making a hand gesture, etc.), and/or some combination of text data, gesture data, and/or audio data.

Speech-processing systems may be configured with multiple applications (e.g., thousands, tens of thousands, or more applications) that can be used to potentially respond to a user request. Applications may be referred to herein as "skills." Natural language processing systems may be effective to process spoken and/or textual natural language inputs to determine data representing a semantic understanding of the inputs. Skills may include any application effective to communicate with a natural language processing system in order to take one or more actions based on inputs from the natural language processing system. For example, a speech-processing system may include music skills, video skills, calendar skills, timer skills, general knowledge answering skills, game skills, device control skills, etc. As described herein, skills receive NLU data comprising slot data and/or intent data and are configured to determine one or more actions based on the slot data and/or intent data. Examples of such actions may include text to be processed into output audio data (e.g., synthetic speech) via a text-to-speech (TTS) component, an executable command effective to play a song from a music service, a movie from a movie service, or the like, an executable command effective to cause a system to perform an action (e.g., turning lights on/off, controlling an appliance, purchasing an item, etc.).

The invocation of a skill by a user's utterance may include a request that an action be taken. The number of applications/skills continues to grow and the rate of growth is increasing as developers become more accustomed to application programming interfaces (APIs) and application development kits provided for the voice user interface system. Rule-based approaches and/or predefined utterance matching may be used in some systems for processing requests spoken in a certain format to invoke a particular application. In at least some examples, a "skill," "skill component," "speech processing skill," and the like may be software running on a computing device, similar to a traditional software application running on a computing device. Such skills may include a voice user interface in addition to or instead of, in at least some instances, a graphical user interface, smart home device interface, and/or other type of interface.

In addition to using the microphone(s) 208 to capture utterances and convert them into digital audio data 214, the speech-enabled device 110 may additionally, or alternatively, receive audio data 214 (e.g., via the communications interface 212) from another device in the environment. Under normal conditions, the speech-enabled device 110 may operate in conjunction with and/or under the control of a remote, network-based or network-accessible speech processing system 120. The speech processing system 120 may, in some instances, be part of a network-accessible computing platform that is maintained and accessible via WAN 104. Network-accessible computing platforms such as this may be referred to using terms such as "on-demand computing", "software as a service (SaaS)", "platform computing", "network-accessible platform", "cloud services", "data centers", and so forth. The speech processing system 120 may be configured to provide particular functionality to large numbers of local (e.g., in-home, in-car, etc.) devices of different users. The WAN 104 is representative of any type of public or private, wide area network, such as the Internet, which extends beyond the environment of the speech-enabled device 110. Thus, the WAN 104 may represent and/or include, without limitation, data and/or voice networks, a wired infrastructure (e.g., coaxial cable, fiber optic cable, etc.), a wireless infrastructure (e.g., radio frequencies (RF), cellular, satellite, etc.), and/or other connection technologies.

In some embodiments, the speech processing system 120 may be configured to receive audio data 214 from the speech-enabled device 110, to recognize speech in the received audio data 214, and to perform functions in response to the recognized speech. In some embodiments, these functions involve sending a command, from the speech processing system 120, to the speech-enabled device 110 to cause the speech-enabled device 110 to perform an action, such as output an audible response to the user speech via output device 210 (e.g., one or more loudspeakers). Thus, under normal conditions, when the speech-enabled device 110 is able to communicate with the speech processing system 120 over WAN 104 (e.g., the Internet), some or all of the functions capable of being performed by the speech processing system 120 may be performed by sending a command over the WAN 104 to the speech-enabled device 110, which, in turn, may process the command for performing actions. For example, the speech processing system 120, via a remote command that is included in remote response data, may instruct the speech-enabled device 110 to output an audible response (e.g., using a local text-to-speech (TTS) synthesis component 256) to a user's question, to output content (e.g., music) via output device 210 (e.g., one or more loudspeakers) of the speech-enabled device 110, or to control other devices in the local environment (e.g., the user's home 101). It is to be appreciated that the speech processing system 120 may be configured to provide other functions, in addition to those discussed herein, such as, without limitation, providing step-by-step directions for navigating from an origin to a destination location, conducting an electronic commerce transaction on behalf of the user 105 as part of a shopping function, establishing a communication session between the user 105 and another user, etc.

In order to process voice commands locally, the speech-enabled device 110 may include a local voice services component 226. When a user utterance including the wakeword is captured by the microphone 208 of the speech-enabled device 110, the audio data 214 representing the utterance is received by a wakeword engine 224 of the voice services component 226. The wakeword engine 224 may be configured to compare the audio data 214 to stored models used to detect a wakeword (e.g., "Computer") that indicates to the speech-enabled device 110 that the audio data 214 is to be processed for determining an intent. Thus, the wakeword engine 224 is configured to determine whether a wakeword is detected in the audio data 214, and, if a wakeword is detected, the wakeword engine 224 can proceed with routing the audio data 214 to an audio front end (AFE) 225 (sometimes referred to as an acoustic front end (AFE)) of the voice services component 226. If a wakeword is not detected in the audio data 214, the wakeword engine 224 can refrain from sending the audio data 214 to the AFE 225, thereby preventing the audio data 214 from being further processed. The audio data 214 can be discarded.

The AFE 225 is configured to transform the audio data 214 received from the wakeword engine 224 into data for processing by a suitable ASR component and/or NLU component. The AFE 225 may reduce noise in the audio data 214 and divide the digitized audio data 214 into frames representing a time intervals for which the AFE 225 determines a number of values, called features, representing the qualities of the audio data 214, along with a set of those values, called a feature vector, representing the features/qualities of the audio data 214 within the frame. Many different features may be determined, and each feature represents some quality of the audio data 214 that may be useful for ASR processing and/or NLU processing. A number of approaches may be used by the AFE 225 to process the audio data 214, such as mel-frequency cepstral coefficients (MFCCs), perceptual linear predictive (PLP) techniques, neural network feature vector techniques, linear discriminant analysis, semi-tied covariance matrices, or other approaches known to those of skill in the art. In some embodiments, the AFE 225 is configured to use beamforming data to process the received audio data 214. Beamforming can be used to distinguish between the directions from which speech and noise originate. Accordingly, the microphones 208 may be arranged in a beamforming array to receive multiple audio signals, where multiple audio sources including speech may be identified in different beams and processed. Beamforming may involve processing multiple audio signals (e.g., originating from multiple microphones in a microphone array) together, such as by time shifting one audio signal with respect to another audio signal, to increase the signal and decrease the noise in the audio. Time offsets in the audio data 214, used by the AFE 225 in beamforming, may be determined based on results of the wakeword engine 224's processing of the audio data 214. For example, the wakeword engine 224 may detect the wakeword in the audio data 214 from a first microphone 208 at time, t, while detecting the wakeword in the audio data 214 from a second microphone 208 a millisecond later in time (e.g., time, t+1 millisecond), and so on and so forth, for any suitable number of audio signals corresponding to multiple microphones 208 in a microphone array.

A speech interaction manager (SIM) 228 of the voice services component 226 may receive the audio data 214 that has been processed by the AFE 225. The SIM 228 may manage received audio data 214 by processing utterances and non-speech noise or sounds as events, and the SIM 228 may also manage the processing of commands that are used to respond to the user speech or non-speech noise or sounds (e.g., by controlling the action(s) of the speech-enabled device 110). The SIM 228 may include one or more client applications 230 for performing various functions at the speech-enabled device 110.

A hybrid request selector component 232 of the speech-enabled device 110 is shown as including a hybrid proxy component (HP) 234, among other components. The HP 234 can be implemented as a layer within the voice services component 226 that is located between the SIM 228 and a speech communication library (SCL) 236, and may be configured to proxy traffic to/from the speech processing system 120. For example, the HP 234 may be configured to pass messages between the SIM 228 and the SCL 236 (such as by passing events and instructions there between), and to send messages to/from a hybrid execution controller component (HEC) 238 of the hybrid request selector component 232. For instance, command data received from the speech processing system 120 can be sent to the HEC 238 using the HP 234, which sits in the path between the SCL 236 and the SIM 228. The HP 234 may also be configured to allow audio data 214 received from the SIM 228 to pass through to the speech processing system 120 (via the SCL 236) while also receiving (e.g., intercepting) this audio data 214 and sending the received audio data 214 to the HEC 238 (sometimes via an additional SCL).

As will be described in more detail below, the HP 234 and the HEC 238 are configured to perform a handshake procedure to connect to each other. As part of this handshake procedure, the HP 234 and the HEC 238 exchange data including, without limitation, configurations, context, settings, device identifiers (ID), networking protocol versions, time zones, and language data (sometimes referred to herein as "locale data"). Based on at least some of this data (e.g., based at least in part on the language data) exchanged during the handshake procedure, the HEC 238 determines whether to accept or reject the connection request from the HP 234. If the HEC 238 rejects the HP's 234 connection request, the HEC 238 can provide metadata to the HP 234 that provides a reason why the connection request was rejected.

A local speech processing component 240' (sometimes referred to as a "speech processing component," a "spoken language understanding (SLU) component," a "speech engine," or an "engine") is configured to process audio data 214 (e.g., audio data 214 representing user speech, audio data 214 representing non-speech noise or sounds, etc.). In some embodiments, the hybrid request selector component 232 may further include a local request orchestrator component (LRO) 242. The LRO 242 is configured to notify the local speech processing component 240' about the availability of new audio data 214 that represents user speech, and to otherwise initiate the operations of the local speech processing component 240' when new audio data 214 becomes available. In general, the hybrid request selector component 232 may control the execution of the local speech processing component 240', such as by sending "execute" and "terminate" events/instructions to the local speech processing component 240'. An "execute" event may instruct the local speech processing component 240' to continue any suspended execution based on audio data 214 (e.g., by instructing the local speech processing component 240' to execute on a previously-determined intent in order to generate a command). Meanwhile, a "terminate" event may instruct the local speech processing component 240' to terminate further execution based on the audio data 214, such as when the speech-enabled device 110 receives command data from the speech processing system 120 and chooses to use that remotely-generated command data.

The LRO 242 may interact with a skills execution component 244 that is configured to receive intent data output from the local speech processing component 240' and to execute a skill based on the intent.

To illustrate how the speech-enabled device 110 can operate at runtime, consider an example where the user 105 utters an expression, such as "Computer, turn off the kitchen lights." The audio data 214 is received by the wakeword engine 224, which detects the wakeword "Computer," and forwards the audio data 214 to the SIM 228 via the AFE 225 as a result of detecting the wakeword. The SIM 228 may send the audio data 214 to the HP 234, and the HP 234 may allow the audio data 214 to pass through to the speech processing system 120 (e.g., via the SCL 236), and the HP 234 may also input the audio data 214 to the local speech processing component 240' by routing the audio data 214 through the HEC 238 of the hybrid request selector 232, whereby the LRO 242 notifies the local speech processing component 240' of the incoming audio data 214. At this point, the hybrid request selector 232 may wait for response data from the speech processing system 120 and/or the local speech processing component 240'.

The local speech processing component 240' is configured to receive the audio data 214 from the hybrid request selector 232 as input, to recognize speech (and/or non-speech audio events) in the audio data 214, to determine an intent (e.g., user intent) from the recognized speech (or non-speech audio event). This intent can be provided to the skills execution component 244 via the LRO 242, and the skills execution component 244 can determine how to act on the intent by generating directive data. In some cases, a directive may include a description of the intent (e.g., an intent to turn off {device A}). In some cases, a directive may include (e.g., encode) an identifier of a second device, such as the kitchen lights, and an operation to be performed at the second device. Directive data that is generated by the skills execution component 244 (and/or the speech processing system 120) may be formatted using Java, such as JavaScript syntax, or JavaScript-based syntax. This may include formatting the directive using JSON. In some embodiments, a locally-generated directive may be serialized, much like how remotely-generated directives are serialized for transmission in data packets over the WAN 104. In other embodiments, a locally-generated directive is formatted as a programmatic API call with a same logical operation as a remotely-generated directive. In other words, a locally-generated directive may mimic remotely-generated directives by using a same, or a similar, format as the remotely-generated directive.

The local speech processing component 240' may include an automatic speech recognition (ASR) component 252' that is configured to perform ASR processing on the audio data 214 to convert the audio data 214 into text data (sometimes referred to herein as "ASR text data," an "ASR result", or "ASR data"). ASR transcribes audio data 214 into text data representing the words of the user speech contained in the audio data 214. A spoken utterance in the audio data 214 can be input to the local ASR component 252', which then interprets the utterance based on the similarity between the utterance and pre-established language models available to the local speech processing component 240'. In some embodiments, the local ASR component 252' outputs the most likely text recognized in the audio data 214, or multiple hypotheses in the form of a lattice or an N-best list with individual hypotheses corresponding to confidence scores or other scores (such as probability scores, etc.). In some embodiments, the local ASR component 252' is customized to the user 105 (or multiple users) who created a user account to which the speech-enabled device 110 is registered. For instance, the language models (and other data) used by the local ASR component 252' may be based on known information (e.g., preferences) of the user 105, and/or on a history of previous interactions with the user 105.

The local speech processing component 240' may also include a local NLU component 254' that performs NLU processing on the generated ASR text data to determine intent data and/or slot data (referred to herein as a "NLU result", or "NLU data") so that directives may be determined (e.g., by the skills execution component 244) based on the intent data and/or the slot data. Generally, the local NLU component 254' takes textual input (such as text data generated by the local ASR component 252') and attempts to make a semantic interpretation of the ASR text data.

Speech Processing System

In other situations, the speech-enabled device 110 may send the audio data 214 to the speech processing system 120 for processing. As described above, the speech processing-enabled device 110 may capture audio using the microphone 206, and send audio data 214 (e.g., representing a spoken user request), corresponding to the captured audio, to the speech processing system 120. The speech processing-enabled device 110 may include a wakeword detection component that detects when input audio includes a spoken wakeword, and when the wakeword is detected, the audio data 214 is sent by the device 110 to the speech processing system 120.

Upon receipt by the speech processing system 120, the audio data 214 may be sent to an orchestrator 330. The orchestrator 330 may include memory and logic that enables the orchestrator 330 to send various pieces and forms of data to various components of the system.

Similar to the operation described above with respect to the local speech processing component 240' of the device 110, the orchestrator 330 may send the audio data 214 to a speech processing component 240. An ASR component 252 of the speech processing component 240 transcribes the audio data 214 into one or more hypotheses representing speech contained in the audio data 214. The speech processing component 240 interprets the speech in the audio data based on a similarity between the characteristics of the audio data corresponding to the speech and pre-established language models. For example, the speech processing component 240 may compare the audio data 214 with models for sounds (e.g., subword units such as phonemes) and sequences of sounds to identify words that match the sequence of sounds in the speech represented in the audio data 214. The speech processing component 240 may send text data generated thereby to an NLU component 254 of the speech processing component 240. The text data output by the speech processing component 240 may include a top scoring hypothesis of the speech represented in the audio data 214 or may include an N-best list including a group of hypotheses of the speech represented in the audio data 214, and potentially respective scores ASR processing confidence scores.

The NLU component 254 attempts to make a semantic interpretation of the phrases or statements represented in the text data input therein. That is, the NLU component 254 determines one or more meanings associated with the phrases or statements represented in the text data based on individual words represented in the text data. The NLU component 254 interprets a text string to derive an intent of the user (e.g., an action that the user desires be performed)

as well as pertinent pieces of information in the text data that allow a device (e.g., the speech processing system 120) to complete the intent. For example, if the text data corresponds to "Play the new album by [Musical Artist]", the NLU component 254 may determine the user intended to invoke a music playback intent to play the identified album.

The speech processing system 120 may include a non-transitory computer-readable memory 370, storing various instructions for operation of the speech processing system 120.

As described above, the speech processing system 120 may include one or more skills 390. The speech processing system 120 may also include a TTS component 380 that synthesizes speech (e.g., generates audio data) corresponding to text data input therein. The TTS component 380 may perform speech synthesis using one or more different methods. In one method of synthesis called unit selection, the TTS component 380 matches text data against one or more databases of recorded speech. Matching units are selected and concatenated together to form audio data. In another method of synthesis called parametric synthesis, the TTS component 380 varies parameters such as frequency, volume, and noise to create an artificial speech waveform output. Parametric synthesis uses a computerized voice generator, sometimes called a vocoder.

The various components of the speech processing system 120 and the speech-enabled device 110 described herein may be implemented in software, hardware, firmware, or some combination thereof.

The speech processing system 120 may reside on speech processing-enabled device 110, in a cloud computing environment, or some combination thereof. For example, the speech processing-enabled device 110 may include computing equipment, some portion of which is configured with some or all of the components or functionality of speech processing system 120 and another portion of which is configured with some or all of the components or functionality of computing device(s) 102. The speech processing-enabled device 110 may then perform a variety of functions on its own (such as when remote communications are unavailable), and/or may communicate (when capable) with computing device(s) 102 and/or the speech processing system 120 to perform other functions. Alternatively, all of the functionality may reside on the speech processing-enabled device 110 or remotely.

Figure 3:
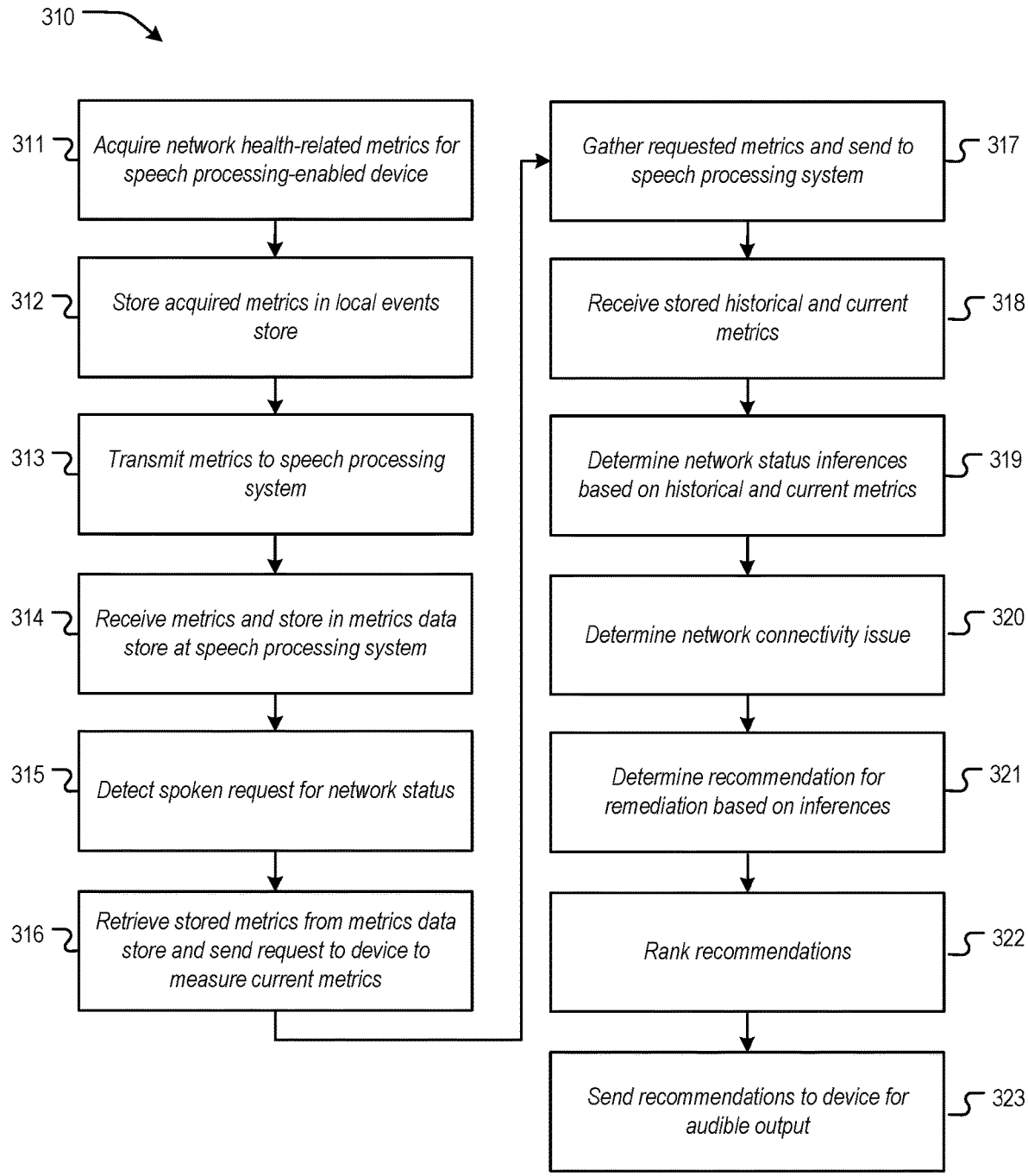
FIG. 3 is a flowchart illustrating a method of managing a speech processing-enabled device, in accordance with embodiments of the present invention.

FIG. 3 is a flowchart illustrating a method 310 of managing a speech processing-enabled device, in accordance with embodiments of the present invention.

In step 311, a device analyzer component 260 of the speech processing-enabled device 110 is programmed to acquire a plurality of network status metrics of the device 110. In step 312, the device 110 stores those metrics in a local events log or events store 262. This detection of metrics can occur on a regular schedule so as to record the state of the device 110 at regular intervals over a period of time. Any desired types of metrics may be gathered. For example, the device analyzer component 260 may detect the RSSI value of the wireless connection between the device 110 and the wireless router 111 and the SNR value of the wireless connection. In some embodiments, the device 110 receives the SNR values from the router 111.

In some embodiments, the device analyzer component 260 makes inferences about the network connectivity state of the device 110 based on the detected metrics, and stores those inferences as one of a plurality of qualitative connection status and wireless signal quality states. The device analyzer component 260 may compare a measured RSSI value with a plurality of ranges of RSSI values, with each range corresponding to a qualitative state. For example, a detected RSSI value of 0 dBm to −50 dBm may correspond to an EXCELLENT_SIGNAL_STRENGTH qualitative state, a detected RSSI value less than −50 dBm and greater than or equal to −70 dBm may correspond to a GOOD signal strength qualitative state, a detected RSSI value less than −70 dBm but greater than or equal to −80 dBm may correspond to a FAIR signal strength qualitative state, a detected RSSI value less than −80 dBm but greater than or equal to −100 dBm may correspond to a POOR signal strength qualitative state, and a detected RSSI value less than −100 dBm may correspond to a EXTREMELY_POOR signal strength qualitative state. The device analyzer component 260 may then store the determined qualitative state as an inferred device state and/or the raw measured RSSI value metric.

The device analyzer component 260 may initiate one or more tests to determine a connection state of the device 110, such as performing a ping test and/or HTTP test. In the ping test, the device 110 sends a ping request to the local host, networking gateway, and/or the DNS servers for the network. In the HTTP test, the device 110 may send an HTTP request to a known URL and detect whether the device 110 is capable of contacting the router 111. Based on the results of the ping and HTTP tests, the device 110 may draw one or more inferences regarding the device's network state. For example, the device analyzer component 260 may infer that successful ping and HTTP tests indicate a good network connection, so the device analyzer component 260 may store a GOOD_CONNECTION inference in the events store 262. If the ping and HTTP tests are unsuccessful, but the device 110 is capable of contacting the router 111, then the device analyzer component 260 may store a LOCAL_CONNECTION inference in the events store 262 to indicate that the device 110's LAN connection to the router 111 is operational, but that the router 111's WAN connection to the Internet is not. If both the HTTP test is unsuccessful and the device 110 is unable to contact the router 111, then the device analyzer component 260 may store a BAD_CONNECTION inference in the events store 262 to indicate that both the LAN connection to the router 111 and the WAN connection to the Internet are not operational.

Other metrics may be determined, such as, e.g., download/upload speed, latency metrics, connectivity to a specific URL or cloud service, WLAN connection state, wireless frequency band being utilized (e.g., 2.4 GHz or 5 GHz), whether the wireless connection of the device 110 is to a captive portal network, a number of packets sent over a period of time, and a number of packets lost over a period of time.

In step 313, the device 110 may send the collection of metrics gathered over the period of time to the speech processing system 120 via a wireless connection with the wireless router 111 and the WAN 104. In some embodiments, the local events store 262 comprises a buffer that stores metrics locally over a period of time (e.g., over 24 hours), and then, after the metrics are sent to the speech processing system 120, the buffer is overwritten by the next 24 hours of metrics collected by the device 110. In other embodiments, such as, e.g., when the device 110 locally performs an analysis of the stored metrics, the data over a longer period of time (e.g., one week, one month, etc.) may be stored in the local events store 262 so that the analysis of the metrics can be performed on a larger data set.

In step 314, the collection of metrics are received by the speech processing system 120. The collection of metrics are received by the orchestrator 330 and sent to the diagnostic component 360, which stores the metrics in a metrics data store 362.

In step 315, the microphone 208 and voice services component 226 detects the spoken request of the user 105 for the network status (e.g., "How is my connection?"). This request may be handled locally by the local speech processing component 240' or sent to the speech processing system 120 for handling by the speech processing component 240.

In step 316, the network diagnostic skill 392 is invoked. The network diagnostic skill 392 sends a request to the diagnostic component 360 to retrieve the stored metrics from the metrics data store 362, and also to send a request to the device analyzer 260 of the device 110 to measure one or more metrics on the device 110.

In step 317, the device analyzer 260 gathers the requested metrics and sends them to the diagnostic component 360 of the speech processing system 120.

In step 318, the network diagnostic skill 392 of the network diagnostic system 391 receives the stored historical metrics and the recently detected current metrics from the diagnostic component 360.

In step 319, the network diagnostic skill 392 utilizes the rule engine 396 to determine one or more inferences about the network status based at least in part on the historical metrics and the recently detected current metrics.

In step 320, based on the one or more inferences about the network status, the network diagnostic skill 392 determines that a network connectivity issue exists. If no such issue is determined, then the flow may stop at this step 320.

In step 321, the network diagnostic skill 392 utilizes the recommendation component 394 and rule engine 396 to determine one or more recommendations for remediation, based at least in part on the one or more inferences. For example, the recommendation component 394 may analyze the recency, frequency, duration, and severity of various connectivity issues to generate the recommendations. In one example in which the device 110 experiences frequent drops in network connectivity, the recommendation component 394 may analyze the network metrics data in the events store 262 to determine frequency by identifying the number of days poor network signal strength is inferred, and may determine duration by analyzing the length of each inferred period of poor network signal strength. The frequency and duration may then be used to identify potential sources for the problem.

If there are more than one recommendations for remediation, in step 322, the network diagnostic skill 392 may rank the recommendations. In one example, the recommendation resulting from the inference based on the most recently-detected metrics is ranked higher than recommendations resulting from inferences based on metrics detected farther in the past. In other examples, a weight (w) for each recommendation is calculated based on, e.g., the duration (d), frequency (n), and severity (s) of network issues, using the following equation:

$$w_i = \left( \frac{d_i n_i}{\sum_{i=1..m} d_i n_i} \right) * s_i.$$

The recommendation having the highest calculated weight is then ranked highest. In another example, any recommendations that are identical to a recommendation previously presented by the device 110 would be ranked lower than other recommendations, in order to avoid providing the user 105 with duplicate recommendations.

In step 323, the network diagnostic skill 392 sends the recommendation for remediation (or the highest ranked recommendation of multiple recommendations have been generated) to the device 110, along with a command effective to cause the device 110 to output an audible response communicating the recommendation for remediation.

In some embodiments, after the device 110 receives the recommendation for remediation from the network diagnostic skill 392, the device 110 then sends this recommendation to the orchestrator 330. The orchestrator 330 then generates audio data corresponding to the verbal instructions to be spoken to the user, and sends that audio data to the device 110.

If the user 105 utters a statement indicating that the speech-enabled device 110 continues to experience network connectivity problems after performing the first, highest ranked recommendation, a second recommendation may be identified (e.g., the second highest ranked recommendation) and communicated to the user to resolve the continued underperformance.

In accordance with some embodiments, if the speech processing-enabled device 110 is unable to directly communicate with the speech processing system 120, another computing device may be used to facilitate communications between the speech processing-enabled device 110 and the speech processing system 120.

As shown in FIG. 1B, the user 105 may also possess a mobile computing device 112 (e.g., a mobile phone), which is in wireless communication with the speech-enabled device 110 while also having a network connection with the speech processing system 120 (e.g., via a cellular network). In some embodiments, the mobile computing device 112 may establish a short-range wireless connection with the device 110 using, for example, a wireless personal area network (WPAN) utilizing low-powered, short-distance wireless network technology such as IrDA, Wireless USB, Bluetooth, Bluetooth Low Energy, or ZigBee. In other examples, the mobile computing device 112 may establish a wireless peer-to-peer connection with the device 110, or may operate a software access point, such as Wi-Fi Direct, to establish the wireless connection with the device 110. In yet other embodiments, if the wireless router 111 remains operational, the mobile computing device 112 may establish an indirect connection with the device 110 over the WLAN via the wireless router 111.

In this example, if the user 105 requests the status of the network connection from the device 110, but the device 110 is unable to communicate with the speech processing system 120, the local speech processing component 240' may be used to interpret the user 105's request. The device analyzer 260 may then generate instructions to be broadcast to the user to connect the mobile device 112 to the device 110, or, if a wireless connection between the mobile device 112 to the device 110 had previously been established, the device 110 may automatically connect to the mobile device 112. In this case, all communications between the device 110 and the speech processing system 120 as described above may pass through the mobile device 112 and utilize the mobile device 112's active network connection to the speech processing system 120. The device 110 may send the user's request and the current metrics to the speech processing system 120 via the mobile device 112, and the speech processing system 120 may send the inferences and/or recommendations for remediation to the device 110 via the mobile device 112. In some examples, the inferences and/or recommendations may be communicated to the user 105 directly from the mobile device 112, either by displaying that information on a display component of the mobile device or by outputting an audible response, similar to the device 110.

In some embodiments, communications may be handled by a software application running on the mobile computing device 112. In this case, if the user 105 makes a request to the device 110, the device 110 may output an audible instruction to the user to check the application on the mobile device for the requested information.

In other embodiments of the present invention, the network diagnostic skill 392, recommendation component 394, and rule engine 396 may be implemented locally on the device 110. The local speech processing component 240' can be used to interpret the requests from the user, and the network diagnostic operations described above can be executed solely on the speech-enabled device 110, without any need to communicate with the speech processing system 120. This implementation may be particularly helpful in situations in which the device 110 cannot establish a network connection with the speech processing system 120, either due to a local failure of the WLAN, or due to a disconnection from the Internet.

In yet other embodiments, metrics may be gathered from other computing devices on the same WLAN as the device 110, and these metrics used to generate the inferences and recommendations for remediation. For example, if the device 110 is unable to connect to the wireless router 111, but the other computing devices are able to successfully connect to the wireless router 111, then the inference may be that the wireless router 111 is operating properly, so the recommendation for remediation could relate to steps the user 105 could take to improve the connection between the device 110 and the wireless router 111. In these embodiments, the other computing devices may also locally execute a device analyzer for gathering network metrics, similar to the device analyzer 260 of the speech-enabled device 110.

In some embodiments, the inferences drawn regarding the network state may also be based in part on other characteristics of the device 110. For example, different wireless communication chipsets may have different bandwidth and signal strength requirements for proper operation. In this case, inferences such as whether the signal strength is good or bad may take into account the wireless communication chipset utilized by the device 110. For some chipsets, an RSSI at the −75 dBm value might result in an inference that the signal strength is fair. However, for devices with more powerful chipsets, the inferences regarding signal strength may correspond to different RSSI value ranges, so the −75 dBm RSSI might be considered good for certain devices. In another example, different audio codecs utilized by the device 110 may have different bandwidth and signal strength thresholds for proper operation. As a result, the threshold bandwidth for determining an inference whether there is an insufficient bandwidth may be a function of the type of codec being used. Therefore, rather than using the same static rules configuration for all devices, some devices may utilize different rules and different ranges for determining qualitative states by taking into account the characteristics of those particular devices.

In accordance with various embodiments, the metrics may be collected by the device 110 upon different types of events. For example, the metrics may be collected only upon request by the user. In other examples, the metrics may be collected upon detection of a state change for the device, such as, e.g., if the device 110 detects that a number of network disconnect events occurring over a predetermined period of time exceeds a predetermined disconnect threshold value, the device 110 may automatically gather all pertinent metrics and send them to the speech processing system 120.

Customer Support

In accordance with some embodiments, the systems and methods for operating a speech processing-enabled device may be utilized in conjunction with a customer support application. For example, if a user 105 calls into a customer support center to request the device 110's network connectivity status, or to request assistance with resolving a problem the user 105 is having with the device 110, the customer support agent may utilize a customer support component 364 in conjunction with the network diagnostic skill 392 and the diagnostic component 360 to gather historical and current metrics, determine inferences based on those metrics, and determine recommendations for remediation based on those inferences. In some cases, the customer support agent will first request authorization from the user 105 to retrieve the network metrics, and then retrieve that data from the user's device 110. In other embodiments, the network metrics data may be automatically retrieved by the customer support component 364 automatically upon detecting the call from the user 105 (e.g., if the user has previously granted this authorization). However, instead of sending the recommendations to the device 110 to be audibly output by the device 110, the customer support agent may view the recommendations on his/her computer display and manually talk the user 105 through one or more recommendations for remediation. The retrieval of network metrics by the customer support component 364 from the device 110 can enable the customer support agent to more quickly diagnose and resolve issues being experienced by the user 105, without having to request that the user gather or provide this data him or herself.

Figure 4A:
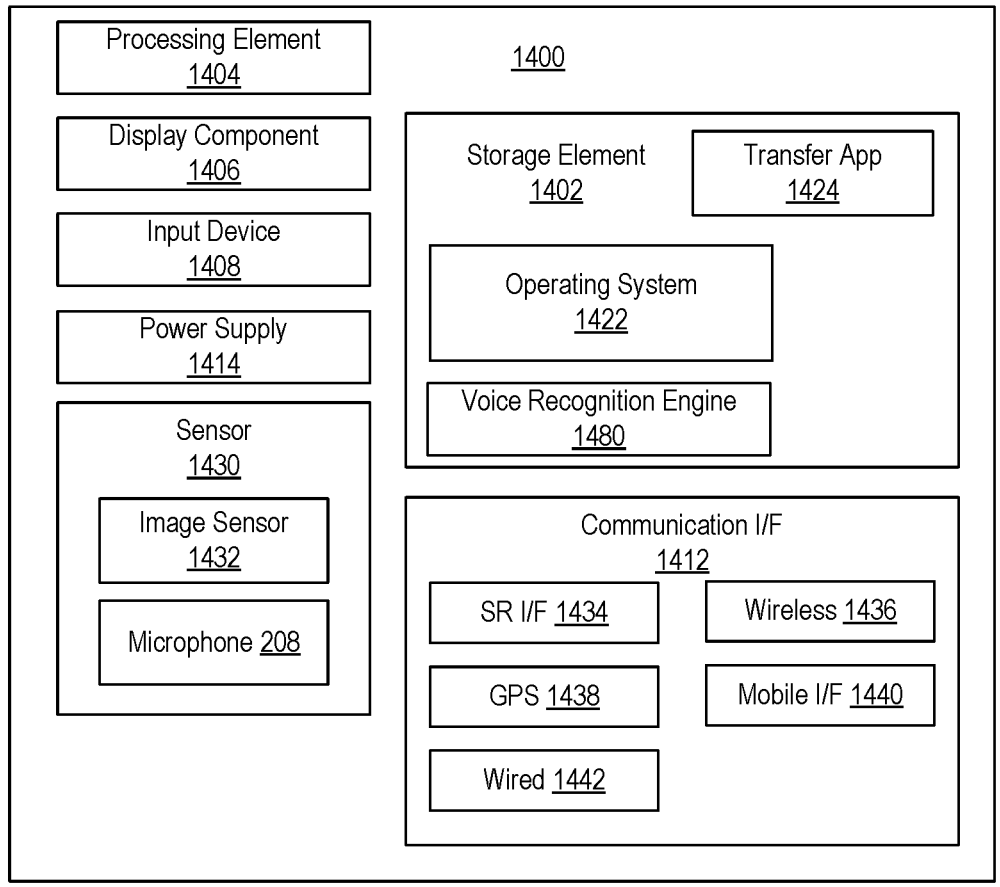
FIGS. 4A-4B are block diagrams showing example architectures of computing devices that may be used in accordance with various embodiments described herein.

FIG. 4A is a block diagram showing an example architecture 1400 of a computing device (e.g., speech processing-enabled device 110), in accordance with various aspects of the present disclosure. It will be appreciated that not all devices will include all of the components of the architecture 1400 and some user devices may include additional components not shown in the architecture 1400. The architecture 1400 may include one or more processing elements 1404 for executing instructions and retrieving data stored in a storage element 1402. The processing element 1404 may comprise at least one processor. Any suitable processor or processors may be used. For example, the processing element 1404 may comprise one or more digital signal processors (DSPs). In some examples, the processing element 1404 may be effective to determine state data related to current resource usage of the speech processing-enabled device 110. Additionally, the processing element 1404 may be effective to determine metadata identifying and/or used to identify incoming and/or existing activity attributes for activities executing on the processing element 1404. The storage element 1402 can include one or more different types of memory, data storage, or computer-readable storage media devoted to different purposes within the architecture 1400. For example, the storage element 1402 may comprise flash memory, random-access memory, disk-based storage, etc. Different portions of the storage element 1402, for example, may be used for program instructions for execution by the processing element 1404, storage of images or other digital works, and/or a removable storage for transferring data to other devices, etc.

The storage element 1402 may also store software for execution by the processing element 1404. An operating system 1422 may provide the user with an interface for operating the computing device and may facilitate communications and commands between applications executing on the architecture 1400 and various hardware thereof. A transfer application 1424 may be configured to receive images, audio, and/or video from another device (e.g., a mobile device, image capture device, and/or display device) or from an image sensor 1432 and/or microphone 208 included in the architecture 1400. In some examples, the transfer application 1424 may also be configured to send the received voice requests to one or more voice recognition servers (e.g., speech processing system 120).

When implemented in some user devices, the architecture 1400 may also comprise a display component 1406. The display component 1406 may comprise one or more light-emitting diodes (LEDs) or other suitable display lamps. Also, in some examples, the display component 1406 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 1406 may be effective to display content determined provided by a skill executed by skill computing device(s) 125. In some examples, the content displayed by display component 1406 may be existing content and/or incoming content described herein.

The architecture 1400 may also include one or more input devices 1408 operable to receive inputs from a user. The input devices 1408 can include, for example, a push button, touch pad, touch screen, wheel, joystick, keyboard, mouse, trackball, keypad, light gun, game controller, or any other such device or element whereby a user can provide inputs to the architecture 1400. These input devices 1408 may be incorporated into the architecture 1400 or operably coupled to the architecture 1400 via wired or wireless interface. In some examples, architecture 1400 may include a microphone 208 or an array of microphones for capturing sounds, such as voice requests. Voice recognition engine 1480 may interpret audio signals of sound captured by microphone 208. In some examples, voice recognition engine 1480 may listen for a wakeword to be received by microphone 208. Upon receipt of the wakeword, voice recognition engine 1480 may stream audio to a voice recognition server for analysis, such as speech processing system 120. In various examples, voice recognition engine 1480 may stream audio to external computing devices via communication interface 1412.

When the display component 1406 includes a touch-sensitive display, the input devices 1408 can include a touch sensor that operates in conjunction with the display component 1406 to permit users to interact with the image displayed by the display component 1406 using touch inputs (e.g., with a finger or stylus). The architecture 1400 may also include a power supply 1414, such as a wired alternating current (AC) converter, a rechargeable battery operable to be recharged through conventional plug-in approaches, or through other approaches such as capacitive or inductive charging.

The communication interface 1412 may comprise one or more wired or wireless components operable to communicate with one or more other computing devices. For example, the communication interface 1412 may comprise a wireless communication module 1436 configured to communicate on a network, such as the WAN 104, according to any suitable wireless protocol, such as IEEE 802.11 or another suitable wireless local area network (WLAN) protocol. A short range interface 1434 may be configured to communicate using one or more short range wireless protocols such as, for example, near field communications (NFC), Bluetooth, Bluetooth LE, etc. A mobile interface 1440 may be configured to communicate utilizing a cellular or other mobile protocol. A Global Positioning System (GPS) interface 1438 may be in communication with one or more earth-orbiting satellites or other suitable position-determining systems to identify a position of the architecture 1400. A wired communication module 1442 may be configured to communicate according to the USB protocol or any other suitable protocol.

The architecture 1400 may also include one or more sensors 1430 such as, for example, one or more position sensors, image sensors, and/or motion sensors. An image sensor 1432 is shown in FIG. 14A. Some examples of the architecture 1400 may include multiple image sensors 1432. For example, a panoramic camera system may comprise multiple image sensors 1432 resulting in multiple images and/or video frames that may be stitched and may be blended to form a seamless panoramic output. An example of an image sensor 1432 may be a camera configured to capture color information, image geometry information, and/or ambient light information.

Figure 4B:
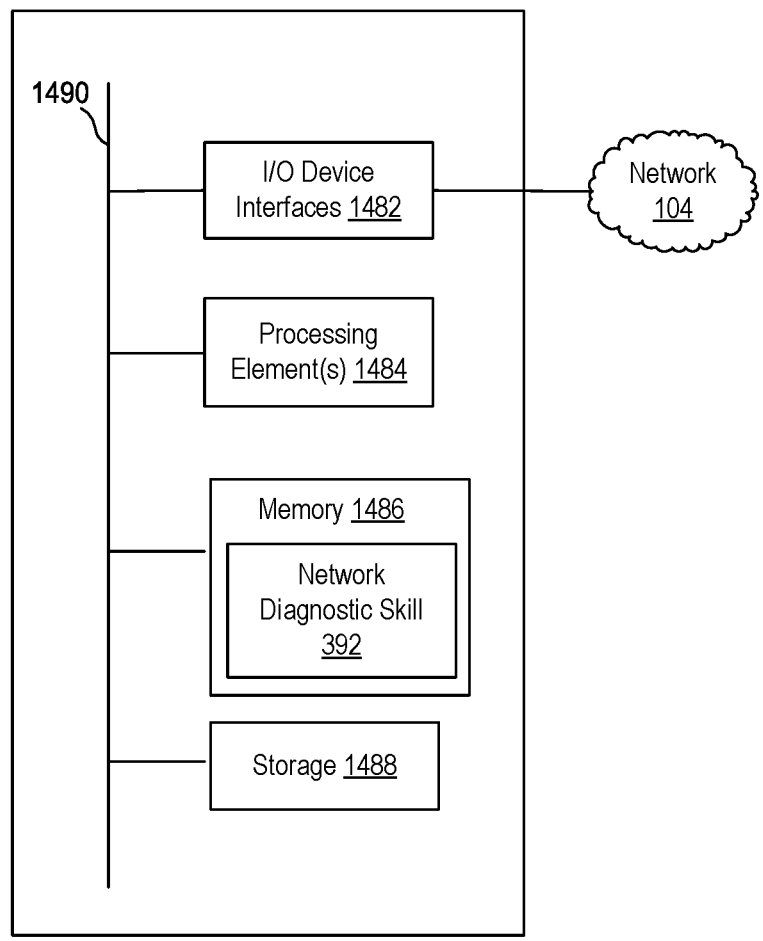

FIG. 4B is a block diagram conceptually illustrating example components of a speech processing system 120, which may assist with ASR processing, NLU processing, applicable protocol recognition, skill execution, and/or command processing. Multiple speech processing computer server may be included in the system, such as one speech processing computer server for performing ASR processing, one speech processing computer server for performing NLU processing, one or more skill computing devices implementing skills, etc. In operation, each of these devices (or groups of devices) may include computer-readable and computer-executable instructions that reside on the respective device, as will be discussed further below.

These devices (e.g., speech processing system 120) may include one or more controllers/processors 1484, which may each include at least one central processing unit (CPU) for processing data and computer-readable instructions, and a memory 1486 for storing data and instructions of the respective device. In at least some examples, memory 1486 may store, for example, a list of N-best intents data that may be generated for a particular utterance. In some examples, memory 1486 may store attributes of existing activities and/or incoming activities for various speech processing-enabled devices 110. In various further examples, memory 1486 may be effective to store instructions effective to program controllers/processors 1484 to perform the various techniques described above. Accordingly, in FIG. 4B, network diagnostic skill 392 is depicted as being stored within memory 1486. The memories 1486 may individually include volatile random access memory (RAM), non-volatile read only memory (ROM), non-volatile magnetoresistive memory (MRAM), and/or other types of memory. Each device may also include a data storage component 1488 for storing data and controller/processor-executable instructions. Each data storage component 1488 may individually include one or more non-volatile storage types such as magnetic storage, optical storage, solid-state storage, etc. Each device may also be connected to removable or external non-volatile memory and/or storage (such as a removable memory card, memory key drive, networked storage, etc.) through respective input/output device interfaces 1482.

Computer instructions for operating each device and its various components may be executed by the respective device's controllers/processors 1484, using the memory 1486 as temporary "working" storage at runtime. A device's computer instructions may be stored in a non-transitory manner in non-volatile memory 1486 (e.g., a non-transitory computer-readable memory), storage 1488, or an external device(s). Alternatively, some or all of the executable instructions may be embedded in hardware or firmware on the respective device in addition to or instead of software.

Each device includes input/output device interfaces 1482. A variety of components may be connected through the input/output device interfaces 1482, as will be discussed further below. Additionally, each device may include an address/data bus 1490 for conveying data among components of the respective device. Each component within a device may also be directly connected to other components in addition to (or instead of) being connected to other components across the bus 1490.

As noted above, multiple devices may be employed in a single system. In such a multi-device system, each of the devices may include different components for performing different aspects of the system's processing. The multiple devices may include overlapping components. The components of the speech processing system 120, as described herein, are exemplary, and may be located as a stand-alone device or may be included, in whole or in part, as a component of a larger device or system.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A method, comprising:
   receiving, by a speech processing system from a speech processing-enabled device, network connectivity metric data comprising one or more Received Signal Strength Indicator (RSSI) values and a plurality of connection states for the speech processing-enabled device;
   storing, by the speech processing system, the network connectivity metric data in a metrics data store;
   receiving, by the speech processing system from the speech processing-enabled device, audio data comprising a spoken request for device connection status;
   performing intent analysis, by a natural language understanding component of the speech processing system, to determine intent data representing the spoken request for the device connection status;
   determining, by the speech processing system based at least in part on the intent data, first data representing network connection characteristics of a wireless communication chipset associated with the speech processing-enabled device;
   determining, by the speech processing system based at least in part on the plurality of connection states and the intent data, that a number of network disconnect events occurring over a first period of time exceeds a predetermined disconnect threshold value;
   determining, by the speech processing system, a predetermined signal strength threshold value associated with the network connection characteristics of the wireless communication chipset;

determining, by the speech processing system based at least in part the one or more RSSI values and the intent data, that a network signal strength is below the predetermined signal strength threshold value; and sending, by the speech processing system, a first command to the speech processing-enabled device effective to cause the speech processing-enabled device to audibly communicate a first recommendation to move the speech processing-enabled device closer to a wireless access point device.

2. The method according to claim 1, further comprising:
receiving, from the speech processing-enabled device, a communication indicating that the speech processing-enabled device continues to experience network connectivity problems after moving the speech processing-enabled device closer to the wireless access point device;
determining, based at least in part on the network connectivity metric data and the first recommendation, a second recommendation to restart the wireless access point device; and
sending a second command to the speech processing-enabled device effective to cause the speech processing-enabled device to audibly communicate the second recommendation.

3. The method according to claim 1, further comprising:
receiving, from a second computing device, second network connectivity metric data representing signal quality of a second wireless connection between the second computing device and the wireless access point device, wherein speech processing-enabled device and the second computing device are wirelessly connected to a local area network (LAN) of the wireless access point device; and
determining a condition of the speech processing-enabled device based at least in part on the second network connectivity metric data from the second computing device.

4. A method, comprising:
receiving, by a system from a first natural language processing-enabled device over a network, first metric data comprising signal strength indicator values representing signal quality of a wireless connection between the first natural language processing-enabled device and a second device, the second device configured to function as a wireless access point;
receiving, by the system from the first natural language processing-enabled device, second metric data representing a connection status of the first natural language processing-enabled device;
receiving, by the system from the first natural language processing-enabled device, a natural language request for third data representing a device condition;
performing, by the system, intent analysis on the natural language request;
determining, based at least in part on the intent analysis, first data representing network connection characteristics of a wireless communication chipset associated with the first natural language processing-enabled device;
determining at least one signal strength value associated with the network connection characteristics;
determining the third data based at least in part on the first data, the first metric data the second metric data, and the at least one signal strength value, wherein the third data is determined based at least in part on the intent analysis;

determining, based at least in part on the third data, a first recommendation for remediation; and
sending a first command to the first natural language processing-enabled device effective to cause the first natural language processing-enabled device to audibly communicate the first recommendation for remediation.

5. The method according to claim 4, wherein:
receiving, by the system from the first natural language processing-enabled device, first metric data comprises receiving first metric data representing a current signal quality state of the wireless connection between the first natural language processing-enabled device and the second device and at least one prior signal quality state of the wireless connection between the first natural language processing-enabled device and the second device; and
receiving, by the system from the first natural language processing-enabled device, second metric data comprises receiving second metric data representing a current connection status state of the first natural language processing-enabled device and at least one prior connection status state of the first natural language processing-enabled device.

6. The method according to claim 4, further comprising:
sending a second command to the first natural language processing-enabled device effective to cause the first natural language processing-enabled device to determine a current state of the first natural language processing-enabled device and to send the current state of the first natural language processing-enabled device to the system; and
determining the third data representing the device condition based at least in part on the first metric data, the second metric data, and the current state of the first natural language processing-enabled device.

7. The method according to claim 4, further comprising:
receiving from a third device fourth metric data representing signal quality of a second wireless connection between the third device and the second device, wherein the first natural language processing-enabled device and the third device are wirelessly connected to a local area network (LAN) of the second device; and
determining the third data representing the device condition based at least in part on the first metric data, the second metric data, and the fourth metric data.

8. The method according to claim 4, further comprising:
determining that the second metric data indicates an operational disconnection of the first natural language processing-enabled device during a time period in which the first metric data indicates a wireless signal quality below a predetermined wireless signal quality threshold value; and
sending the first command to the first natural language processing-enabled device effective to cause the first natural language processing-enabled device to audibly communicate the first recommendation for remediation to position the first natural language processing-enabled device closer to the second device.

9. The method according to claim 4, wherein:
the first metric data further comprises a plurality of signal-to-noise ratio (SNR) values.

10. The method according to claim 4, further comprising:
determining, based at least in part on the first metric data and a device characteristic of the first natural language processing-enabled device, the third data representing the device condition, wherein the third data comprises a first one of a plurality of qualitative network connectivity states between the first natural language processing-enabled device and the system.

11. The method according to claim 4, further comprising:
determining, based at least in part on the first metric data and an audio codec utilized by the first natural language processing-enabled device, the third data representing the device condition, wherein the audio codec comprises a bandwidth threshold and the third data indicates a bandwidth below the bandwidth threshold.

12. The method according to claim 4, further comprising:
receiving from a mobile computing device at least one of:
(a) fourth metric data representing signal quality of the wireless connection between the first natural language processing-enabled device and the second device, wherein the fourth metric data are received by the mobile computing device from the first natural language processing-enabled device via a second wireless connection between the first natural language processing-enabled device and the mobile computing device; or
(b) fifth metric data representing a second connection status of the first natural language processing-enabled device, wherein the fifth metric data are received by the mobile computing device from the first natural language processing-enabled device via the second wireless connection; and
determining, based on at least one of the fourth metric data or the fifth metric data, sixth data representing the device condition;
determining, based at least in part on the sixth data, a second recommendation for remediation; and
sending the second recommendation for remediation to the mobile computing device.

13. The method according to claim 4, further comprising:
determining, based at least in part on the first metric data and the second metric data, fourth data representing the device condition;
determining, based at least in part on the fourth data, a second recommendation for remediation; and
ranking the first recommendation for remediation over the second recommendation for remediation.

14. A method of operating a first natural language processing-enabled device, said method comprising:
storing first metric data in a memory of the first natural language processing-enabled device, the first metric data comprising signal strength indicator values representing signal quality of a wireless connection between the first natural language processing-enabled device and a second device, the second device configured to function as a wireless access point;
storing second metric data in the memory of the first natural language processing-enabled device, the second metric data representing a connection status of the first natural language processing-enabled device;
sending the first metric data and the second metric data to a system;
receiving a first natural language request indicating a user inquiry for a condition of the first natural language processing-enabled device;
sending to the system a request for third data representing a device condition;
receiving the third data from the system, wherein the third data is determined based at least in part on intent data analysis of the first natural language request, the first metric data, the second metric data, first data representing network connection characteristics of a wireless communication chipset of the first natural language processing-enabled device, and at least one signal strength value associated with the network connection characteristics; and
generating audio data representing the third data representing the device condition.

15. The method according to claim 14, further comprising:
receiving a first recommendation for remediation; and
generating audio data representing the first recommendation for remediation.

16. The method according to claim 15, further comprising:
receiving a second natural language request indicating continued underperformance of the first natural language processing-enabled device;
sending a second request indicating continued underperformance of the first natural language processing-enabled device;
receiving a second recommendation for remediation; and
generating audio data representing the second recommendation for remediation.

17. The method according to claim 14, further comprising:
receiving a request for network diagnostics;
determining fourth metric data representing a current signal quality of the wireless connection between the first natural language processing-enabled device and the second device, and fifth metric data representing a current connection status of the first natural language processing-enabled device; and
sending the fourth metric data and the fifth metric data to the system.

18. The method according to claim 14, further comprising:
receiving a second natural language request representing a second user inquiry for a second condition of the first natural language processing-enabled device;
determining a failure to establish a network connection with the system;
establishing a second wireless connection with a third computing device; and
sending a second request for device condition to the system via the third computing device.

19. The method according to claim 14, further comprising:
receiving a second natural language request representing a second user inquiry for a second condition of the first natural language processing-enabled device;
determining a failure to establish a network connection with the system;
establishing a second wireless connection with a third computing device; and
audibly communicating instructions to the third computing device, the instructions related to the second condition of the first natural language processing-enabled device.

20. The method according to claim 14, further comprising:
storing first metric data in the memory of the first natural language processing-enabled device, the first metric data representing a current signal quality state of the wireless connection between the first natural language processing-enabled device and the second device and at least one prior signal quality state of the wireless connection between the first natural language processing-enabled device and the second device; and storing second metric data in the memory of the first natural language processing-enabled device, the second metric data representing a current connection status state of the first natural language processing-enabled device and at least one prior connection status state of the first natural language processing-enabled device.

\* \* \* \* \*